L. A. YOUNG.
SPRING FRAME CONSTRUCTION.
APPLICATION FILED NOV. 1, 1909.

1,155,391.

Patented Oct. 5, 1915.
2 SHEETS—SHEET 1.

Witnesses
O. B. Baenziger
J. G. Howlett

Inventor
Leonard A. Young
By E. S. Wheeler & Co.
Attorneys

L. A. YOUNG.
SPRING FRAME CONSTRUCTION.
APPLICATION FILED NOV. 1, 1909.

1,155,391.

Patented Oct. 5, 1915.
2 SHEETS—SHEET 2.

Witnesses
O. B. Baenziger.
I. G. Howlett.

Inventor
Leonard A. Young.
By T. S. Wheeler
Attorneys

UNITED STATES PATENT OFFICE.

LEONARD A. YOUNG, OF DETROIT, MICHIGAN.

SPRING-FRAME CONSTRUCTION.

1,155,391. Specification of Letters Patent. Patented Oct. 5, 1915.

Application filed November 1, 1909. Serial No. 525,635.

*To all whom it may concern:*

Be it known that I, LEONARD A. YOUNG, a citizen of the United States, residing at Detroit, in the county of Wayne, State of Michigan, have invented certain new and useful Improvements in Spring-Frame Construction; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a spring frame for upholstery work, especially designed for use at the back of an automobile body to afford an easy rest for the rider.

The invention consists in the construction and arrangement of parts hereinafter more fully set forth and claimed.

The primary object of the invention is to provide a resilient back for automobile bodies of such construction as to support the rider in a comfortable position, and wherein the arrangement is such as to effect economy in the use of hair, and at the same time maintain the spring frame in proper position and preserve the desired contour of the upholstery.

A further object is to provide a construction which will prevent the sagging or flattening of the roll at the top and which will after compression insure the return of the parts to their normal position.

A further object is to prevent the sagging of the outer portion of the spring frame and preserve the parts in their proper relative positions.

The above objects are attained by the structure illustrated in the accompanying drawings, wherein—

Figure 1:
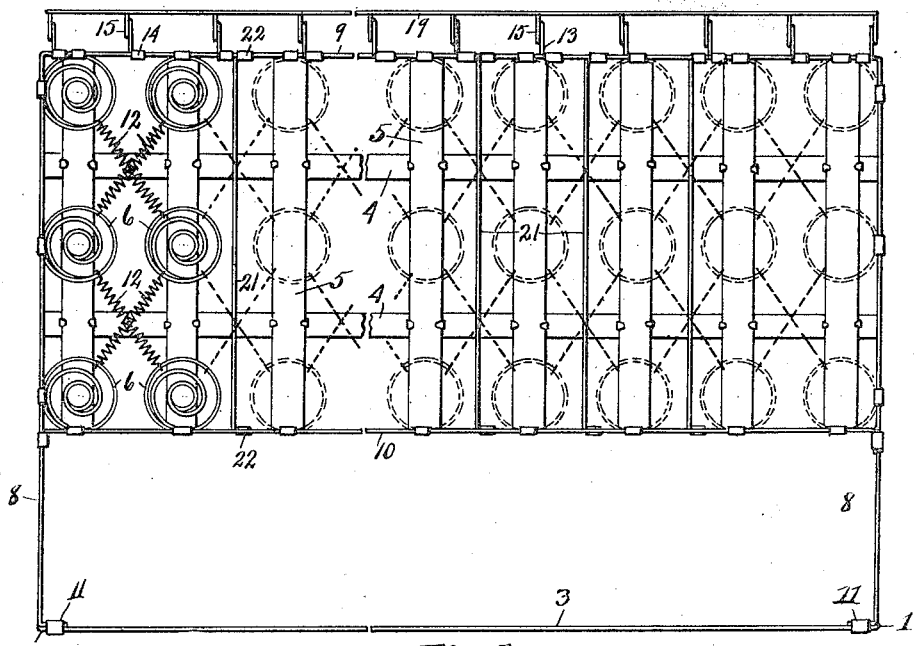
Figure 2:
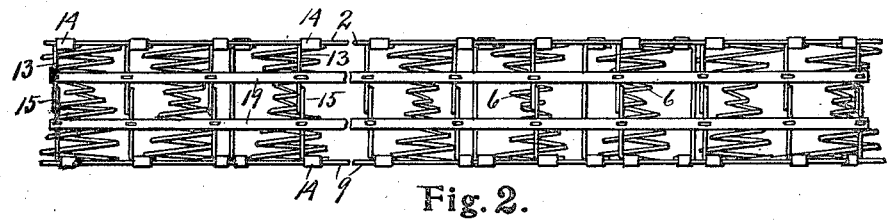
Figures 3, 4:
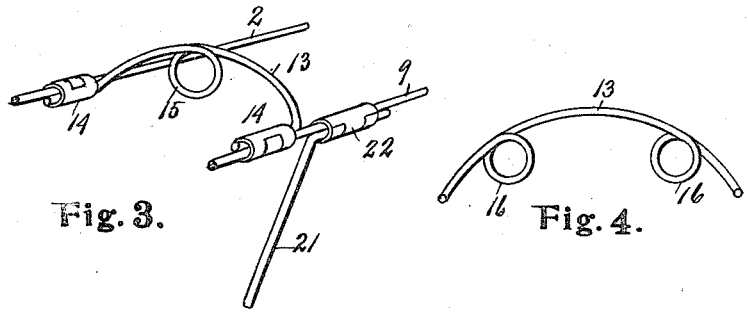
Figure 5:
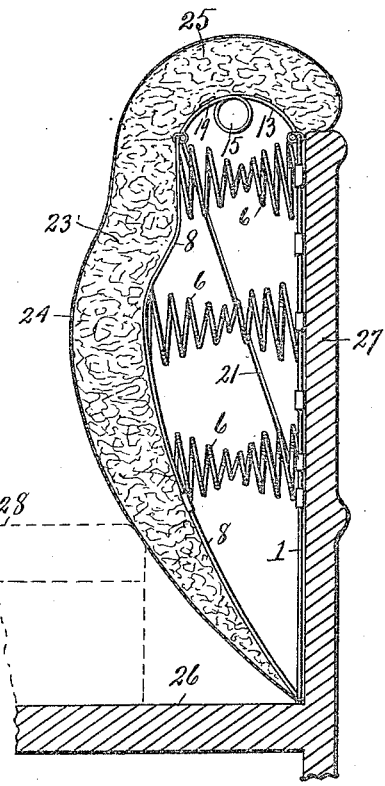
Figure 6:
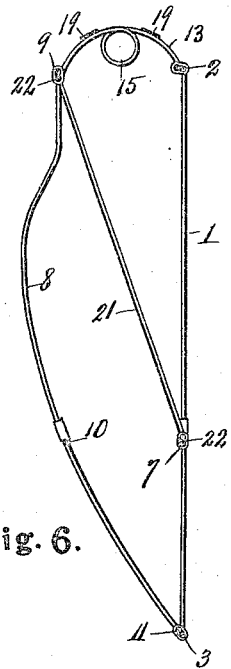
Figure 7:
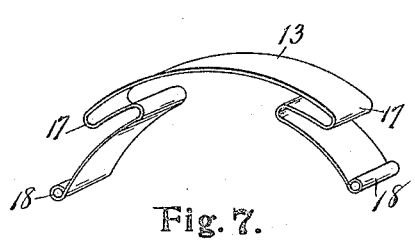
Figure 8:
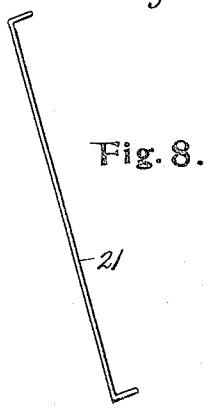
Figures 9, 10:
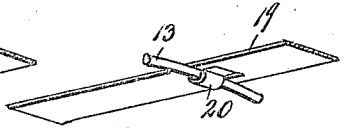

Figure 1 is an elevation of a spring frame construction involving my invention. Fig. 2 is a top plan view thereof. Fig. 3 is a fragmentary view in perspective, showing one of the spring arches connecting the top border wires of the frame construction. Fig. 4 is an elevation of one of the spring arches, showing a modification in the form thereof. Fig. 5 is a fragmentary view in section through the back and seat frame of a vehicle body, showing the application of my invention thereto. Fig. 6 is a vertical section through the spring frame, the springs being omitted. Fig. 7 is a perspective view of a modified form of the spring arch. Fig. 8 is an elevation of one of the diagonal brace rods extending between the outer and inner frames of the structure to support the outer frame in position. Fig. 9 is a fragmentary view in perspective of a portion of one of the supporting strips that connect the arches at the top to maintain them in parallel relation and hold the hair stuffing from passing therethrough. Fig. 10 is a similar view showing the manner of attaching said strips to the arches.

Referring to the characters of reference, 1 designates the rear portion or primary section of the spring frame which is rectangular in form and which has an upper border wire 2 and a lower border wire 3; the vertical marginal wires of the rear section of the frame being connected by the horizontal strips 4. Mounted upon and crossing the horizontal strips 4 are the vertical strips 5 which are connected to said horizontal strips and support the coiled springs 6 which are mounted thereon in any suitable manner. The upper end of the vertical strips 5 are attached to the upper border wire 2, while the lower ends of said vertical strips are attached to the lower cross bar 7 which at its opposite ends is secured to the vertical marginal wires of the rear section of the spring frame. The outer secondary section of the spring frame comprises the curved marginal wires 8 connected at their upper ends by the upper border wire 9, and also connected by a lower cross bar 10, the lower ends of said marginal wires curving rearwardly and being secured by clips 11 to the lower border wire 3 of the inner or rear section of the spring frame. The marginal wires 8 of the outer frame are curved to give to the spring back the desired contour, as clearly shown in Figs. 5 and 6, and are normally held distended by the coiled springs 6, the marginal springs of which are attached to said marginal wires, and to the upper border wire 9 and cross bar 10, as clearly shown in Fig. 1. To maintain the springs 6 in position, they are connected throughout the central portion of the structure by the coiled springs 12, shown at the left of Fig. 1.

To assist in holding the upper end of the spring frame in position, and at the same time to afford a support for the hair or other stuffing which is employed in upholstery, a plurality of connecting arches are employed whose ends are fastened by suitable clips 14 to the upper border wires 2 and 9, respectively, of the component portions of the spring frame. These arches are preferably made of spring wire with a large central coil 15 therein to give the necessary resiliency, as shown in Fig. 3, but may be made with two smaller coils, as shown at 16 in Fig. 4, or of a flat strip of spring steel, as shown in Fig. 7, provided with return bends 17 therein to insure the necessary flexibility. Where the flat strip of spring steel is employed, eyes 18 are formed in the ends of said strip which embrace the border wires 2 and 9 to effect a connection between said parts. For the purpose of tying the arches 13 together and of affording additional support for the stuffing of hair or other material, flat metallic strips 19 are employed which extend across the arches, as clearly shown in Figs. 1 and 2, and to which the arches are secured by the tongues 20 which are struck therefrom, as shown in Fig. 9 and are caused to embrace the strands of the arches, as shown in Fig. 10, whereby the arches are tied together and are held properly spaced and in an upright position.

By extending the marginal wires 8 downwardly to the bottom border wire 3, the marginal portions of the outer part or section of the spring frame are supported in a manner to prevent sagging. To provide a proper support for the central portion of the outer part or section of the frame, the intermediate diagonal brace rods 21 are employed, the upper ends of which are secured by clips 22 to the top border wire 9 of the outer section, while the inner ends of said brace rods are in like manner secured to the central cross bar 7 of the inner section of the frame. By this arrangement the outer frame section with its stuffing of hair 23 and its exterior covering of leather 24 is supported so as to maintain it perfectly in place and preserve the contour thereof.

The arches 13 being resilient, will yield when pressure is applied to the outer face of the cushion so that the required flexibility of the cushion is not impaired, while the presence of the arches connecting the upper parts of the spring frame, assists in tying said parts yieldingly together and effects a material saving in the quantity of hair or other stuffing material required to form the top roll 25.

As constructed the outer section of the spring frame becomes hinged to the rear or inner section at the point 11 where said parts are brought together at their lower ends, enabling the upper portion of the outer part of the spring frame to move inwardly against the action of the springs 6 when pressure is brought to bear thereon, said springs as well as the arches 13, serving to return the outer part or section of the spring frame to its normal position when the pressure is released; while the diagonal braces 21 without interfering with the resiliency of the spring frame construction, serve at all times to support the outer section of said frame and prevent it working down and the face of the cushion from losing its desired shape.

When in position in the body of the vehicle, the lower border wire 3 rests upon the bottom 26 of the seat, while the rear section of the spring frame is secured in any proper manner to the back 27, as clearly shown in Fig. 5, in which view the dotted lines 28 indicate the upholstered seat.

Having thus fully set forth my invention, what I claim as new and desire to secure by Letters Patent, is:—

1. A spring frame construction, comprising two separate, vertically arranged frames having spaced upper border wires in substantially parallel relation, and a plurality of resilient arches projecting above said border wires and adapted to yieldingly support the upholstery in an arc above the top borders of the frames, said arches extending between said border wires to which their terminals are flexibly connected.

2. A spring frame construction, comprising spaced border members in substantially parallel relation, a plurality of resilient arches extending between said border members to yieldingly support the upholstery in a projected arc, and a laterally extending member crossing between and connecting the tops of said arches.

3. A spring frame construction having body springs, separate frames yieldingly held in spaced relation thereby, and a plurality of arch springs connected to the frame structure to lie outside of the plane of the frame sides and to act independently of the other springs for yieldingly supporting applied upholstery in an arch beyond the frame sides.

4. A spring frame construction, comprising a fixed primary frame, a movable secondary frame, a plurality of projected arches extending between the tops of said frames to support the upholstery in an arc above the borders thereof, and diagonally disposed brace rods connecting said frames to support the movable secondary frame independently of said arches.

5. A spring frame construction, comprising a fixed primary frame vertically disposed, a movable secondary frame in front of the primary frame, a plurality of projected resilient arches extending between and connecting the tops of said frames, and means for resiliently suspending the secondary frame in advance of the primary frame independently of said arches.

6. In combination with a supporting frame, a helical spring rising therefrom and adapted to oscillate along its helical axis, an arched spring uniting the support and the free end of the helical spring, the arc extending beyond the edge of the supporting frame and forming a support for an upholstering cover extending from the plane of the top of the helical spring around the edge of the frame, and a pair of connecting and bracing members extending from the curved portion of said arc spring to corresponding portions of similar adjacent springs.

7. A spring frame construction, comprising a fixed primary frame vertically disposed, a secondary frame located in front of the primary frame and having curved marginal wires hinged at their lower ends to the bottom of said primary frame, coiled springs interposed between said frames, a plurality of brace rods extending diagonally between said frames and jointedly connected thereto to support the primary frame, and a plurality of resilient arches extending above and yieldingly connecting the tops of said frames, and a laterally extending member connecting the tops of said arches.

8. An edge spring for a cushion seat, consisting of a unitary piece of spring wire adapted to be yieldingly attached at its top to the top of one of the coiled springs of the seat and to be yieldingly held thereby at the desired distance above the plane of the base, and to engage at its bottom against the lateral face of the exposed frame piece, its central portion being convolute and arched to extend over the edge of the seat frame and interiorly of the outer edge thereof at the yieldingly anchored top, whereby an upholstering cushion rested thereon may be yieldingly held from contact with the seat frame along the edge thereof, substantially as described.

9. In a spring construction, the combination of a fixed supporting frame substantially vertical, a movable frame in front of the supporting frame, a plurality of helical springs between said frames, arches connecting the upper edges of the supporting frame and the movable frame and forming a support for the upholstering extending over the tops of said arches and the front of the movable frame, and a pair of flat resilient bars connected to the movable frame and to the supporting frame for the purpose of supporting the movable frame independently of said arches.

In testimony whereof, I sign this specification in the presence of two witnesses.

LEONARD A. YOUNG.

Witnesses:
E. S. WHEELER,
I. G. HOWLETT.